United States Patent
Fodor

(10) Patent No.: US 10,466,994 B2
(45) Date of Patent: Nov. 5, 2019

(54) SYSTEM AND METHODS FOR WIRELESS FIRMWARE UPGRADES USING ONE-WAY BROADCAST TRANSMISSIONS

(71) Applicant: Digi International Inc., Minnetonka, MN (US)

(72) Inventor: Eugene F. Fodor, Plymouth, MN (US)

(73) Assignee: Digi International Inc., Minnetonka, MN (US)

( * ) Notice: Subject to any disclaimer, the term of this patent is extended or adjusted under 35 U.S.C. 154(b) by 156 days.

(21) Appl. No.: 15/343,094

(22) Filed: Nov. 3, 2016

(65) Prior Publication Data

US 2018/0121191 A1    May 3, 2018

(51) Int. Cl.
G06F 9/44    (2018.01)
G06F 8/65    (2018.01)
H04L 12/24    (2006.01)

(52) U.S. Cl.
CPC .............. *G06F 8/65* (2013.01); *H04L 41/082* (2013.01)

(58) Field of Classification Search
CPC ....................................................... G06F 8/65
See application file for complete search history.

(56) References Cited

U.S. PATENT DOCUMENTS

| | | | | |
|---|---|---|---|---|
| 7,747,997 B1* | 6/2010 | Rao | ........................... | G06F 8/65 717/169 |
| 2004/0193998 A1* | 9/2004 | Blackburn | ......... | G06Q 20/3552 714/763 |
| 2006/0010437 A1* | 1/2006 | Marolia | ................... | G06F 8/65 717/168 |
| 2013/0276128 A1* | 10/2013 | Konetski | ............... | G06F 21/572 726/26 |
| 2014/0351569 A1* | 11/2014 | Durand | ................... | G06F 8/654 713/1 |

* cited by examiner

*Primary Examiner* — Hang Pan
(74) *Attorney, Agent, or Firm* — Fogg & Powers LLC

(57) ABSTRACT

Methods and systems for wireless firmware upgrades are provided. In one embodiment, a system comprises: at least one master source radio and one or more client radio devices in wireless communication with the master source radio. The master source radio transmits a firmware image block broadcast to the client radio devices comprising sequentially transmitted firmware image blocks, wherein the master source radio transmits each block a plurality of times. Each of the plurality of sequentially transmitted firmware image blocks is transmitted as payload within a broadcast block, the broadcast block further comprising metadata associated with the payload. The client radio devices each include a firmware memory and a boot loader. The boot loader assembles a firmware image from the firmware image block broadcast and stores the firmware image into the memory. Transmission of the firmware image block broadcast is not controlled using feedback from the client radio devices.

18 Claims, 4 Drawing Sheets

SYSTEM AND METHODS FOR WIRELESS FIRMWARE UPGRADES USING ONE-WAY BROADCAST TRANSMISSIONS

BACKGROUND

Wireless radio devices today typically include integrated circuits with a transmitter and receiver each capable of operating over multiple channels. Different versions of these radio devices may comprise common hardware components, but have customizable firmware that enables a single hardware design to be leveraged for delivering the different configurations and capabilities requested by customers. A problem exists for manufacturers, however, with respect to inventory management and post-manufacture configuration of the customizable firmware to meet specific customer orders. A manufacturer that inventories a specific configuration runs the risk that demand for that inventoried configuration might be lower than expected, while demand for another non-inventoried configuration is higher than expected. Manufactured radios may be left with unconfigured firmware until a specific order is received for a specific configuration. However, to perform this firmware configuration task, each radio to be configured must be installed into a manufacturing fixture to have the proper firmware loaded. This process is time and labor intensive, and causes delay in product delivery.

For the reasons stated above and for other reasons stated below which will become apparent to those skilled in the art upon reading and understanding the specification, there is a need in the art for systems and methods for wireless firmware upgrades.

SUMMARY

The Embodiments of the present disclosure provide methods and systems for wireless firmware upgrades and will be understood by reading and studying the following specification.

In one embodiment, a wireless firmware configuration system comprises: at least one master source radio; and one or more client radio devices in wireless communication with the at least one master source radio. The at least one master source radio transmits a firmware image block broadcast to the one or more client radio devices, the firmware image block broadcast comprising a plurality of sequentially transmitted firmware image blocks, wherein the at least one master source radio transmits each firmware image block of the plurality of sequentially transmitted firmware image blocks a plurality of times, wherein each of the plurality of sequentially transmitted firmware image blocks is transmitted as the payload within a broadcast block, the broadcast block further comprising metadata associated with the payload. The one or more client radio devices each include a firmware memory and a boot loader, wherein the boot loader assembles a firmware image from the firmware image block broadcast and stores the firmware image into the firmware memory; and transmission of the firmware image block broadcast is not controlled using feedback from the one or more client radio devices.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the disclosed embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address the challenges of providing mass firmware flashing to radio devices by using unidirectional wireless communications to transmit firmware configurations from a master source radio to those radio devices targeted for firmware flashing (referred to herein as the "client radio devices'). Although the term "flashing" is often associated with reprogramming of EEPROM memory, as used herein, the term "flashing" refers to installing new, or overwriting of existing, firmware stored in any non-volatile memory device regardless of the underlying technology of the memory device. Broadcast of firmware images from the master radio source to the client radio devices is a one-way communication without flow control or acknowledgement signals received back from the client radio devices. As explained in greater detail below, the firmware images are subdivided and transmitted by the master source radio as blocks which are repeated multiple times, or otherwise continuously repeated for a specified time duration.

Figure 1:
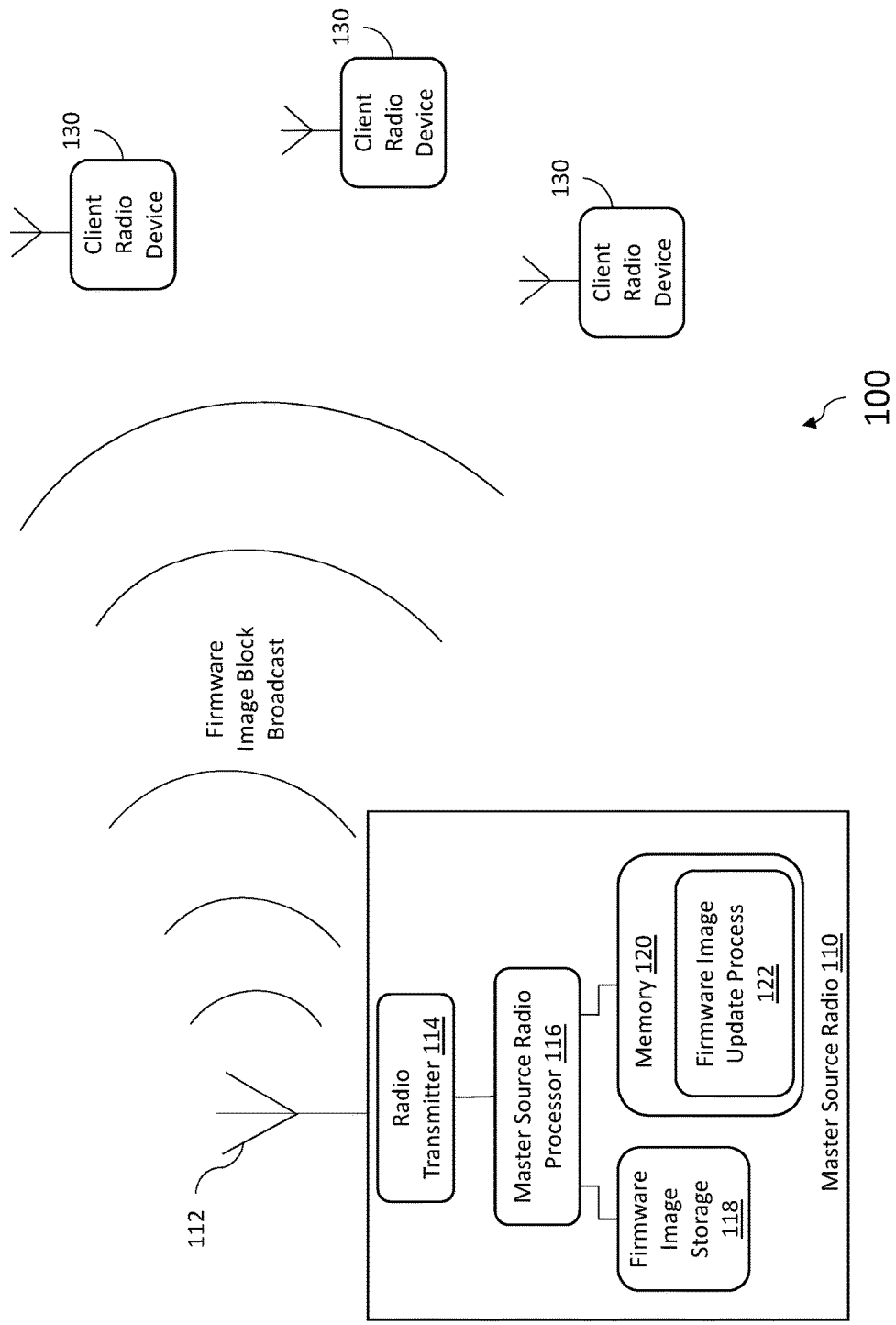
FIG. 1 is a diagram of a wireless firmware flashing system of one embodiment of the present disclosure.

FIG. 1 is a diagram of a wireless firmware flashing system 100 of one embodiment of the present disclosure. Wireless firmware flashing system 100 comprises at least one master source radio 110 which wirelessly broadcasts firmware update data to one or more client radio devices 130. In one embodiment, the master source radio 110 includes a radio transmitter 114 coupled to a radio antenna 112, from which the master source radio 110 transmits the firmware update data. Coupled to the radio transmitter 114 are a master source radio processor 116, firmware image storage 118 and a memory 120 comprising a firmware image update process 122 executed by the master source radio processor 116. The firmware image storage 118 comprises a memory device within which are stored one or more firmware image files of firmware images to be provided to the client radio devices 130. The master source radio processor 116 by executing the firmware image update process 122 wirelessly transfers the firmware images to the client radio devices 130 as described below.

In operation, master source radio 110 transmits a signal referred to herein as a "firmware image block broadcast" to the client radio devices 130. The firmware image block broadcast provides the receiving client radio devices 130 with a firmware image which those devices may then use to update their own firmware memory. In one embodiment, the firmware images to be provided to the client radio devices 130 are segmented into a plurality of firmware image blocks by the master source radio processor 116. Each of the firmware image blocks is then included as payload within a broadcast block wirelessly transmitted to the client radio devices 130 by the radio transmitter 114.

In addition to carrying the payload that includes a firmware image block, the broadcast block will also carry metadata associated with the payload. For example, the metadata associated with the payload may include a memory address that indicates where that firmware image block should be stored on the receiving client radio devices 130. In some implementations the metadata may also include a checksum or other error detection data that the receiving client radio devices 130 may use to validate the integrity of the payload data received in a broadcast block, and/or to validate the integrity of a complete firmware image received from the master source radio 110. In other implementations, different broadcast blocks may include different types of metadata. For example, in one embodiment, a broadcast block carrying a first firmware image block for a firmware image may include metadata that indicates its payload carries the first firmware image. The metadata may also include an identifier that indicates to a client radio device 130 whether the transmitted broadcast block carries payload intended for that client radio device. In some embodiments, the metadata may further convey the total number of firmware image blocks the complete firmware image has been segmented into so that the client radio devices 130 may know the number of blocks to expect when receiving a complete firmware image. Other information, such as block size, may also be included.

Figure 2:
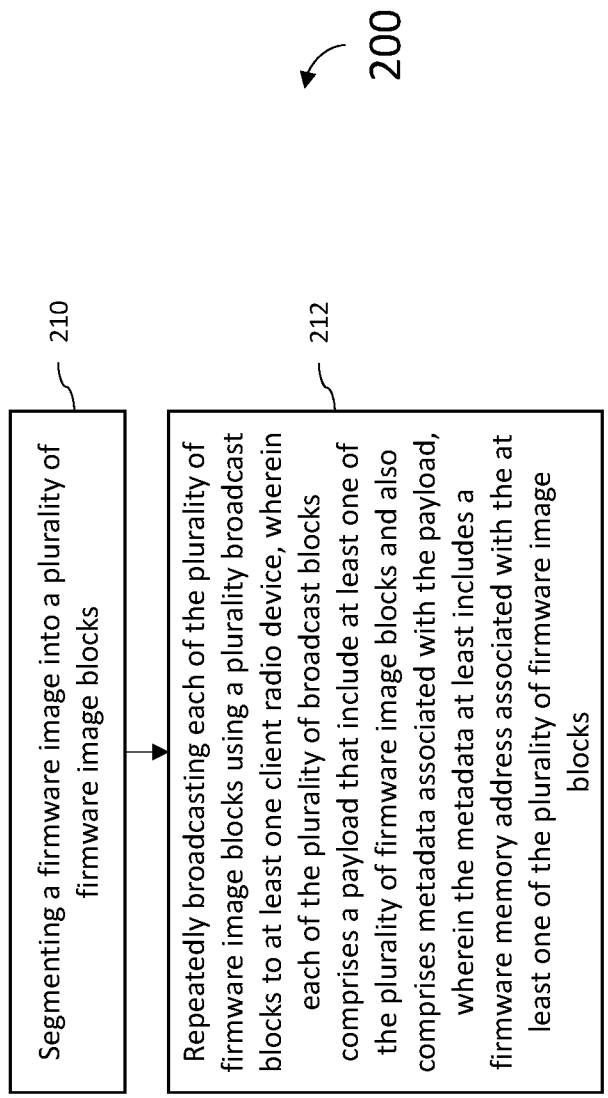
FIG. 2 is a flow chart illustrating a method for a master source radio for a wireless firmware flashing system of one embodiment of the present disclosure.

As the description above indicates, the firmware image block broadcast transmitted from the master radio source 110 is a one-way communication. The master radio source 110 does not receive flow control signals or acknowledgements or any other feedback from the client radio devices 130 that regulates its transmissions. As such, the master source radio 110 will transmit each broadcast block multiple times to increase the probability of achieving a valid delivery of the complete firmware image to each client radio device 130. Each broadcast block may be repeatedly transmitted for a predetermined number of times, or continuously repeated for a specified time duration. This process is summarized by the flow chart shown in FIG. 2. As shown in FIG. 2, the process 200 begins at 210 with segmenting a firmware image into a plurality of firmware image blocks. The process proceeds to 212 with repeatedly broadcasting each of the plurality of firmware image blocks using a plurality broadcast blocks to at least one client radio device. Each of the plurality of broadcast blocks comprises a payload that includes at least one of the plurality of firmware image blocks and also comprises metadata associated with the payload. The metadata may at least include a firmware memory address associated with the at least one of the plurality of firmware image blocks. Processing of the broadcast block transmitted by the master source radio 110 is described below in FIG. 4.

Figure 3:
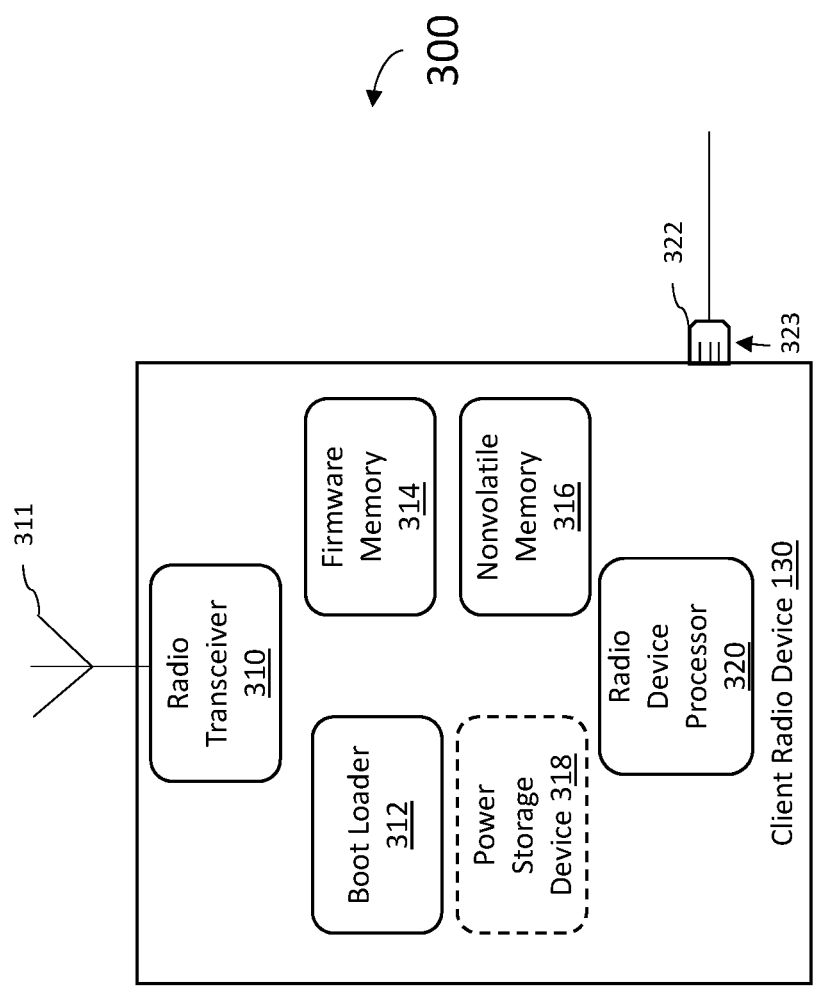
FIG. 3 is a diagram of a client radio device that utilized a wireless firmware flashing system of one embodiment of the present disclosure.

FIG. 3 is a block diagram illustrating an example client radio device 130 such as described above in FIG. 1. For the example shown in this figure, client radio device 130 includes a radio transceiver 310, a boot loader 312, firmware memory 314, non-volatile memory 316, an optional power storage device 318, and a radio device processor 320. As alluded to above, any number of these components may be integrated together and/or otherwise realized in an integrated circuit comprising the components. In some embodiments, the firmware memory 314 and non-volatile memory 316 may comprise the same memory component. Also, in some implementations the boot loader 312 may include instruction code resident on a memory device that is executed by the radio device processor 320. As would be readily understood by one of ordinary skill in the art who has reviewed this disclosure, a client radio device 130 needs to be within signal range of the master source radio 110 to receive the firmware image block broadcast. That being said, since the master source radio 110 may be implemented as a permanent installation in a facility with amply power resources, its radio transmitter 114 can be configured to broadcast a sufficiently strong signal to service the desired portions of that facility.

In one embodiment, the boot loader 312 includes the various processes for receiving and processing the firmware image blocks from the master source radio 110 flashing a complete firmware image to firmware memory 314. In one embodiment the master source radio 110 will transmit a broadcast cycle during which each of the firmware image blocks for the firmware image is transmitted. When the master source radio 110 reaches the final block, it may resume with another broadcast cycle stating at the first block. In addition, during each broadcast cycle, transmission of each firmware image block is repeated several times before the master source radio 110 progresses to transmitting the next firmware image block.

Figure 4:
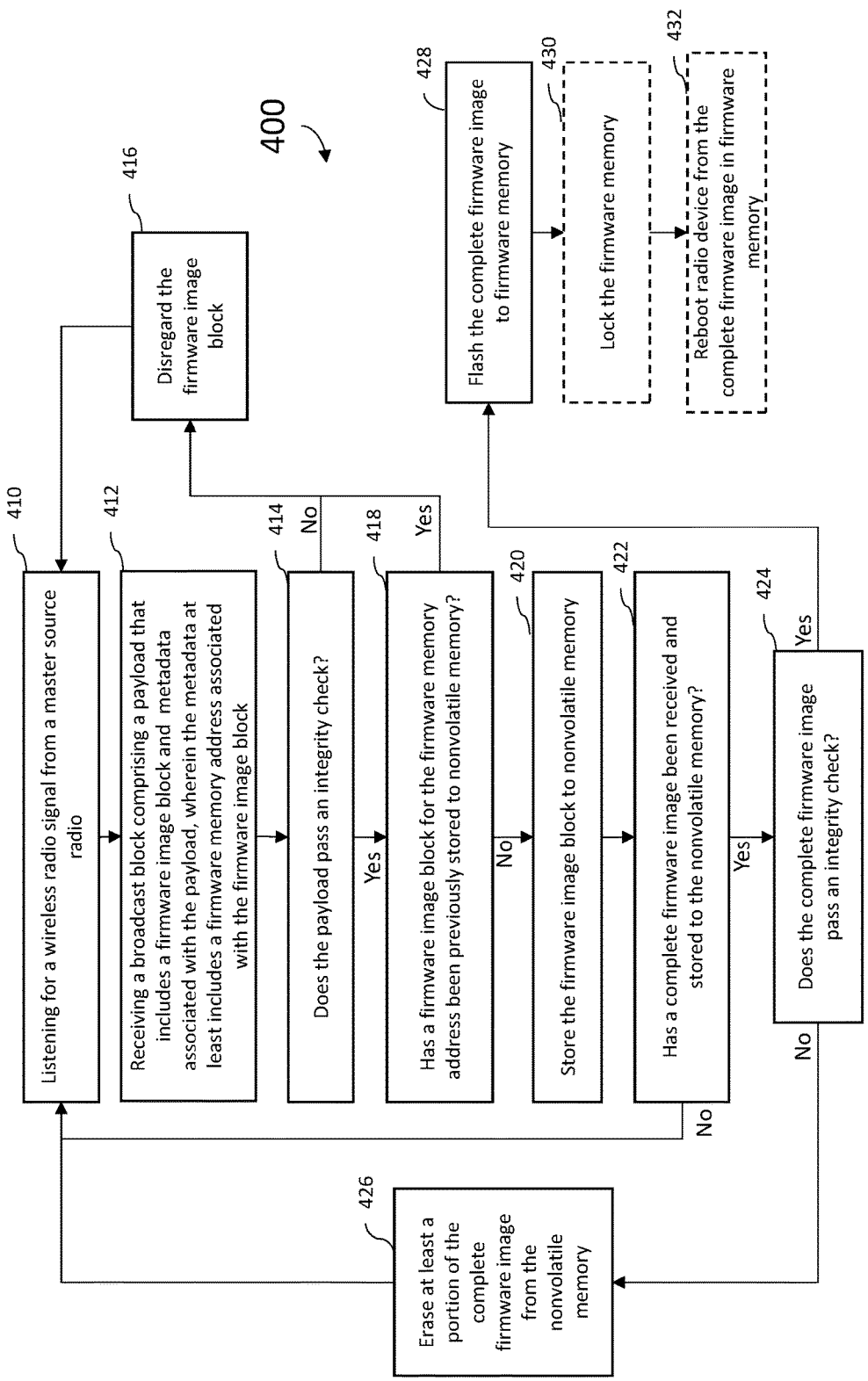
FIG. 4 is a flow chart illustrating a method for a client radio device for a wireless firmware flashing system of one embodiment of the present disclosure.

FIG. 4 is a flow chart illustrating one embodiment of a process 400 which may be utilized by a bootloader 312 to process the received Firmware Image Block Broadcast from the master source radio 110. The process begins at 410 with the client radio device 130 listening for a wireless radio signal from a master source radio 110, and proceeds to receiving a broadcast block comprising a firmware image block payload and associated metadata as discussed above.

Upon receiving a broadcast block, the process proceeds to 414 where the process verifies whether the payload received passes an integrity check that indicates it is error free. For example, in one embodiment, the payload received (i.e., the firmware image block) is compared against a checksum provided in the metadata. In other embodiments, other integrity checking schemes may be utilized. If the payload does not pass the integrity check, the process proceeds to 416 where that firmware image block is discarded, and the process returns to 410 to listen for the next transmission from the master source radio 110.

The process 400 also proceeds to 418 where it determines whether the firmware image block received in the payload had previously been successfully received and stored to memory. It should be appreciated that once a client radio device 110 successfully receives a firmware image block, it may ignore subsequent transmissions of that firmware image block. If the process at 418 determines that it did already receive and store into memory a valid copy of the firmware image block, then it may proceed to 416 to disregard the duplicate of that firmware image block and return to 410 to listen for the next transmission from the master source radio 110.

If the process at 418 determines that it has not already received and stored into memory a valid copy of that firmware image block, the process proceeds to 420 with storing the firmware image block into nonvolatile memory at the memory address indicated in the associated metadata. At that point, the process proceeds to 422 to determine whether it has now received a complete firmware image that has been stored to the nonvolatile memory. If not, the process continues to 410 to listen for the next transmission from the master source radio 110. This sequence thusly repeats until all image blocks for the firmware image have been successfully received. If after a complete broadcast cycle, the client radio device 130 is still missing one or more firmware image blocks, it continues to listens for those missing blocks as the master source radio 110 repeats another broadcast cycle.

If a complete firmware image has been received and stored to the nonvolatile memory, the process proceeds to 424 to perform an integrity check of the complete firmware image now resident on the nonvolatile memory. For example, in one embodiment, the complete firmware image is compared against a checksum provided in the received metadata. In other embodiments, other integrity checking schemes may be utilized. If the completed firmware image fails the overall integrity check, the process proceeds to 426. In one embodiment, at block 426 the client radio device may purge the entirety of the firmware image saved in the nonvolatile memory and begin the process 400 over again at 410. Alternatively, if the overall integrity check at 424 is able to determine which firmware image block or blocks caused the integrity check to fail, it may purge only those block identified as corrupt and return to 410 to listen to the master source radio 110 for those specific blocks it needs and attempt to obtain and store into the nonvolatile memory non-corrupted versions of those blocks. Because master source radio receives no feedback from the client radio devices, each client radio device is responsible for its own bookkeeping as to which blocks it has successfully received, and which it has not, and a number of such bookkeeping methods would be known to those of skill in the art. For example, in one embodiment, the bookkeeping is tracked by checking if the payload received matches the block written in non-volatile memory. In another embodiment, the total number of blocks is tracked and a counter is kept for the number of valid block writes. Many other bookkeeping methods would be known by those with skill in the art.

If the completed firmware image passes the overall integrity check at 424, the process proceeds to 428 where the completed firmware image stored in the nonvolatile memory is flashed to the firmware memory. At that point, the boot loader 312 may optionally lock the firmware memory at 430 to finalize production of the client radio device. Locking of the firmware memory may be desired, for example, for devices where tampering with the firmware is intended to be to be prohibited. In other implementations, such as were the upgradability of firmware to radio device already delivered to a consumer is a desirable feature, the firmware may remain unlocked and modifiable. For example, in some implementation a radio device previously deployed by a customer may be placed back into the above described firmware update mode (for example, via a wirelessly received control signal) to install updated firmware. In another embodiment, a partial lock may be employed where a firmware update is accepted only if it is cryptographically signed, uniquely identifiable (by the radio technology or other restriction), or authenticated.

In some embodiments, once the complete firmware image is flashed to firmware memory, the client radio device may optionally be rebooted to execute the newly installed firmware. Also in some embodiments, once the client radio device successfully reaches 428 and flashes the complete firmware image to the firmware memory, the device may cease listening to the master radio source. In some embodiments, the firmware once executed may be put into a mode where it will once again accept new firmware. Specifically, it may have a special mode that forces it to enter a bootloader that receives new firmware from a master radio.

In some embodiments of the process above, the client radio device notes the first memory address into which it stored a firmware image block to keep track of where in the memory it stored saving image blocks. For each subsequent non-repeat firmware image block received, it keeps track of the memory addresses where image blocks are stored and continues listening for blocks it has not previously successfully received, and written them into the nonvolatile memory. If the bootloader misses an image block (i.e., the master source radio 110 proceeds to transmitting the next image block before the client radio device successfully stores the prior image block), it just skips the missed block and waits until the next time it is retransmitted by the master source radio 110.

This described nested retransmission of firmware image blocks over multiple broadcast cycles increases the likelihood that a client radio device 130 will eventually receive a complete and valid copy of the firmware image even if there was temporary interference or other event that caused data corruption affecting specific transmissions. Another advantage of this process is that it is not necessary for the master source radio 110 to receive communications back from the client radio devices 130 to which it is broadcasting. In fact, the master source radio 110 would not even need to be aware of how many client radio devices 130 (if any) it is transmitting to at any one time or any other details regarding the client radio devices 130 undergoing the firmware flashing.

It should be appreciated from reading this disclosure that the number of times each firmware image block is repeated during a broadcast cycle, and the number of times the image broadcast cycle should be repeated, may be tailored based on the specifics of the facility in which the master source radio 110 is located to ensure that each client radio device 130 eventually receives a complete and valid firmware image. These numbers may be obtained by performing an iteration of calibration cycles at the facility where test client radio devices 130 are to have their firmware flashed. The test client radio devices 130 may be distributed at points within the facility and set up to flash a test firmware image received form the master source radio 110 and determine the number of times block retransmissions and broadcast cycles need to be repeated in order to obtain reliable firmware flashing results given the environment at that facility.

In some embodiments, boot loader 312 is configured so that the client radio devices 130 are preprogramed to begin listening for the master source radio's transmissions on power-up. In some embodiments, the boot loader 312 is programmed so that the device can identify specific transmissions from a master source radio 110 intended for that device 130. That is, the client radio device 130 may upon initialization tune in and listen for a specific broadcast signal to begin process 400. In one embodiment, a preamble or other metadata included in the transmission from the master source radio 110 may include an identifier used by the boot loader 312 which indicates which client radio devices 130 a transmitted firmware image is intended for.

In some embodiments, client radio devices 130 may optionally include a battery or similar power storage device 318 that can be used to power the device 130 at least long enough for an initial firmware image to be received from the master source radio 110 and flashed to the firmware memory 314. In other embodiments, the newly manufactured client radio devices 130 may be coupled via a cable (such as shown at 322 in FIG. 3) to a power source that powers the devices 130 during the firmware flashing process so that an initial firmware image may be received from the master source radio 110 and flashed to the device 130. For example, such a cable 322 may connect to the client radio device 130 using power and ground pins (shown at 323) to supply power to the device 130. In such embodiments, a visual or audible indicator (LED or speaker) may also be used to indicate that the firmware flashing process is complete to a human operator.

In one embodiment, upon the initial powering, the boot loader 312 places the client radio device 130 into a "manufacturing" or "firmware update" mode to initiate the process 400 described above. In some embodiments, when a client radio device 130 is turned on, the boot loader 312 first looks for a valid firmware image in the firmware memory 314. If that image is present, it boots the device 130 using that firmware. Alternatively, if no valid firmware image is present in the firmware memory 314, it proceeds to place the client radio device into the "manufacturing" or "firmware update" mode.

In some embodiments, the boot loader 312 may force the device 130 to perform a firmware update even if a valid firmware image is present in the firmware memory 314. For example, the boot loader 312 may look for a flag indicating that the device has been selected for a firmware flashing. If the flag is set, then the boot loader 130 may proceed to erase the firmware image currently present in the firmware memory 314, and place the client radio device into the "firmware update" mode to initiate process 400.

In some embodiments, the cable 322 providing power to the newly manufactured client radio device 130 may include one or more additional pins 323 providing a signal that may be used to 1) set the flag telling the boot loader 312 that the device 130 has been selected for a firmware flashing, and/or 2) which master source radio 110 firmware image block broadcast it should listen to. For example, in one embodiment different voltage levels on a pin 323 would indicate to the boot loader 312 which master source radio 110 signal is providing the correct firmware image for that client radio device 130.

Although the client radio devices 130 when initially manufactured may be a relatively simple and unsophisticated devices with minimal wireless capabilities configured to listen for a signal from the mater source radio 110 and flash firmware, after flashing of the firmware image received from the master source radio 110, it may become a quite sophisticated radio device capable of bidirectional communication of voice, digital data, video or other information using one or more radio technologies such as but not limited to cellular, IEEE 802.11 (Wi-Fi), IEEE 802.15.4 (ZigBee), Thread, or any number of other wireless connectivity technologies. It should also be appreciated that alternate embodiments include non-manufacturing implementations where the client radio devices 130 may be already deployed into service at different locations throughout a facility, and the master source radio 110 may be utilized as described above to update firmware resident on the client radio devices 130.

EXAMPLE EMBODIMENTS

Example 1 includes a wireless firmware configuration system, the system comprising: at least one master source radio; and one or more client radio devices in wireless communication with the at least one master source radio; wherein the at least one master source radio transmits a firmware image block broadcast to the one or more client radio devices, the firmware image block broadcast comprising a plurality of sequentially transmitted firmware image blocks, wherein the at least one master source radio transmits each firmware image block of the plurality of sequentially transmitted firmware image blocks a plurality of times, wherein each of the plurality of sequentially transmitted firmware image blocks is transmitted as payload within a broadcast block, the broadcast block further comprising metadata associated with the payload; wherein the one or more client radio devices each include a firmware memory and a boot loader, wherein the boot loader assembles a firmware image from the firmware image block broadcast and stores the firmware image into the firmware memory; and wherein transmission of the firmware image block broadcast is not controlled using feedback from the one or more client radio devices.

Example 2 includes the system of example 1, wherein the at least one master source radio transmits multiple cycles of the plurality of sequentially transmitted firmware image blocks, and each firmware image block of the plurality of sequentially transmitted firmware image blocks is repeated a plurality of times per each of the multiple cycles.

Example 3 includes the system of any of examples 1-2, wherein the metadata associated with the payload includes a memory address that indicates where a firmware image block should be stored in the firmware memory.

Example 4 includes the system of any of examples 1-3, wherein the metadata associated with the payload includes error detection data to validate the integrity of the payload or to validate the integrity of a complete firmware image.

Example 5 includes the system of any of examples 1-4, wherein the error detection data comprises a checksum.

Example 6 includes the system of any of examples 1-5, wherein the master source radio comprises: a radio transmitter coupled to a radio antenna; a master source radio processor; a firmware image storage that includes the firmware image; and a firmware image update process executed by the master source radio processor; wherein the firmware image update process segments the firmware image into the plurality of sequentially transmitted firmware image blocks and transmits the firmware image block broadcast from the radio transmitter.

Example 7 includes the system of any of examples 1-6, wherein each of the one or more client radio devices comprises: a radio transceiver; the boot loader; the firmware memory; a radio device processor; and a non-volatile memory; wherein the boot loader is configured to store a firmware image block from the plurality of sequentially transmitted firmware image blocks into the non-volatile memory when the firmware image block passes a first integrity check, and discards the firmware image block from the plurality of sequentially transmitted firmware image blocks when the firmware image block does not pass the first integrity check.

Example 8 includes the system of example 7, wherein the boot loader is configured to determine when the non-volatile memory has received a complete copy of the firmware image and flash the complete copy of the firmware image to the firmware memory when the complete copy of the firmware image passes a second integrity check.

Example 9 includes the system of example 8, wherein the boot loader is configured to discard at least part of the complete copy of the firmware image when the complete copy of the firmware image does not pass the second integrity check.

Example 10 includes the system of any of examples 8-9, wherein the boot loader locks the firmware memory after flashing the complete copy of the firmware image to the firmware memory.

Example 11 includes the system of any of examples 7-10, wherein upon initialization, the boot loader is configured to place a client radio device into a firmware update mode to listen for the firmware image block broadcast when no valid firmware image is present in the firmware memory.

Example 12 includes the system of any of examples 7-11, wherein upon initialization, the boot loader is configured to place a client radio device into a firmware update mode to listen for the firmware image block broadcast when a flag is set.

Example 13 includes the system of any of examples 1-12, wherein the firmware image reconfigures the one or more client radio devices to operate as two-way radio devices.

Example 14 includes a wireless firmware update method, the method comprising: with at least one a client radio device, listening for a wireless radio signal from a master source radio, the wireless radio signal comprising a firmware image block broadcast; receiving a broadcast block comprising a payload of a firmware image block and associated metadata, wherein the metadata includes at least a firmware memory address associated with the firmware image block, wherein transmission of the firmware image block broadcast is not controlled using feedback from the at least one a client radio device; storing the firmware image block into a non-volatile memory when the firmware image block passes a first integrity check; and discarding the firmware image block when the firmware image block does not pass the first integrity check; and determining when the non-volatile memory has received a complete copy of a firmware image; and flashing the complete copy of the firmware image to a firmware memory when the complete copy of the firmware image passes a second integrity check.

Example 15 includes the method of example 14, further comprising: discarding at least part of the complete copy of the firmware image when the complete copy of the firmware image does not pass the second integrity check.

Example 16 includes the method of any of examples 14-15, wherein the master source radio transmits multiple cycles of a plurality of sequentially transmitted firmware image blocks, and each firmware image block of the plurality of sequentially transmitted firmware image blocks is repeated a plurality of times per each of the multiple cycles.

Example 17 includes the method of any of examples 14-16, wherein the metadata associated with the payload includes a memory address that indicates where a firmware image block should be stored in the firmware memory.

Example 18 includes the method of any of examples 14-17, further comprising: placing the at least one client radio device into a firmware update mode to listen for the firmware image block broadcast when no valid firmware image is present in a firmware memory.

Example 19 includes the method of any of examples 14-18, further comprising: placing the at least one client radio device into a firmware update mode to listen for the firmware image block broadcast when a flag is set.

Example 20 includes the method of any of examples 14-19, further comprising: rebooting the at least one a client radio device using the complete copy of the firmware image flashed to the firmware memory.

In various alternative embodiments, system and/or device elements, method steps, or example implementations described throughout this disclosure (such as the boot loader, master source radio, client device radios, other devices, or sub-parts of any thereof, for example) may be implemented using one or more computer systems, microcontrollers, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present disclosure. Therefore, it is manifestly intended that embodiments be limited only by the claims and the equivalents thereof.

What is claimed is:

1. A wireless firmware configuration system, the system comprising:
　at least one master source radio; and
　one or more client radio devices in wireless communication with the at least one master source radio;
　wherein the at least one master source radio transmits a firmware image block broadcast to the one or more client radio devices, the firmware image block broadcast comprising a plurality of sequentially transmitted firmware image blocks, wherein the at least one master source radio transmits each firmware image block of the plurality of sequentially transmitted firmware image blocks a plurality of times, wherein each of the plurality of sequentially transmitted firmware image blocks is transmitted as payload within a broadcast block, the broadcast block further comprising metadata associated with the payload;
　wherein the one or more client radio devices each include a firmware memory and a boot loader, wherein the boot loader assembles a firmware image from the firmware image block broadcast and stores the firmware image into the firmware memory; and wherein transmission of the firmware image block broadcast is not controlled using feedback from the one or more client radio devices;

wherein the at least one master source radio transmits multiple cycles of the plurality of sequentially transmitted firmware image blocks, and each firmware image block of the plurality of sequentially transmitted firmware image blocks is repeatedly transmitted to each of the one or more client radio devices a plurality of times per each of the multiple cycles.

2. The system of claim 1, wherein the metadata associated with the payload includes a memory address that indicates where a firmware image block should be stored in the firmware memory.

3. The system of claim 1, wherein the metadata associated with the payload includes error detection data to validate the integrity of the payload or to validate the integrity of a complete firmware image.

4. The system of claim 3, wherein the error detection data comprises a checksum.

5. The system of claim 1, wherein the master source radio comprises:
   a radio transmitter coupled to a radio antenna;
   a master source radio processor;
   a firmware image storage that includes the firmware image; and
   a firmware image update process executed by the master source radio processor;
   wherein the firmware image update process segments the firmware image into the plurality of sequentially transmitted firmware image blocks and transmits the firmware image block broadcast from the radio transmitter.

6. The system of claim 1, wherein each of the one or more client radio devices comprises:
   a radio transceiver;
   the boot loader;
   the firmware memory;
   a radio device processor; and
   a non-volatile memory;
   wherein the boot loader is configured to store a firmware image block from the plurality of sequentially transmitted firmware image blocks into the non-volatile memory when the firmware image block passes a first integrity check, and discards the firmware image block from the plurality of sequentially transmitted firmware image blocks when the firmware image block does not pass the first integrity check.

7. The system of claim 6, wherein the boot loader is configured to determine when the non-volatile memory has received a complete copy of the firmware image and flash the complete copy of the firmware image to the firmware memory when the complete copy of the firmware image passes a second integrity check.

8. The system of claim 7, wherein the boot loader is configured to discard at least part of the complete copy of the firmware image when the complete copy of the firmware image does not pass the second integrity check.

9. The system of claim 8, wherein the boot loader locks the firmware memory after flashing the complete copy of the firmware image to the firmware memory.

10. The system of claim 7, wherein upon initialization, the boot loader is configured to place a client radio device into a firmware update mode to listen for the firmware image block broadcast when no valid firmware image is present in the firmware memory.

11. The system of claim 7, wherein upon initialization, the boot loader is configured to place a client radio device into a firmware update mode to listen for the firmware image block broadcast when a flag is set.

12. The system of claim 1, wherein the firmware image reconfigures the one or more client radio devices to operate as two-way radio devices.

13. A wireless firmware update method, the method comprising:
   with at least one a client radio device, listening for a wireless radio signal from a master source radio, the wireless radio signal comprising a firmware image block broadcast;
   receiving a broadcast block comprising a payload of a firmware image block and associated metadata, wherein the metadata includes at least a firmware memory address associated with the firmware image block, wherein transmission of the firmware image block broadcast is not controlled using feedback from the at least one a client radio device;
   storing the firmware image block into a non-volatile memory when the firmware image block passes a first integrity check;
   discarding the firmware image block when the firmware image block does not pass the first integrity check;
   determining when the non-volatile memory has received a complete copy of a firmware image; and
   flashing the complete copy of the firmware image to a firmware memory when the complete copy of the firmware image passes a second integrity check;
   wherein the master source radio transmits multiple cycles of a plurality of sequentially transmitted firmware image blocks, and each firmware image block of the plurality of sequentially transmitted firmware image blocks is repeatedly transmitted to the at least one a client radio device a plurality of times per each of the multiple cycles.

14. The method of claim 13, further comprising:
   discarding at least part of the complete copy of the firmware image when the complete copy of the firmware image does not pass the second integrity check.

15. The method of claim 14, wherein the metadata associated with the payload includes a memory address that indicates where a firmware image block should be stored in the firmware memory.

16. The method of claim 14 further comprising:
   placing the at least one client radio device into a firmware update mode to listen for the firmware image block broadcast when no valid firmware image is present in a firmware memory.

17. The method of claim 14 further comprising:
   placing the at least one client radio device into a firmware update mode to listen for the firmware image block broadcast when a flag is set.

18. The method of claim 14, further comprising:
   rebooting the at least one a client radio device using the complete copy of the firmware image flashed to the firmware memory.

* * * * *